E. M. JENKINS.

SANITARY MOUTHPIECE.

APPLICATION FILED JAN. 14, 1915.

Reissued July 6, 1915.

13,942

2 SHEETS—SHEET 1.

WITNESSES:

Helen L. Schley

L. Lewis

INVENTOR

E. M. JENKINS

BY

Jack N. Ashley

ATTORNEY

E. M. JENKINS.

SANITARY MOUTHPIECE.

APPLICATION FILED JAN. 14, 1915.

Reissued July 6, 1915.

13,942.

2 SHEETS—SHEET 2.

WITNESSES:

Lilan Sibley

L. Lewis

INVENTOR

E. M. JENKINS

BY Jack A. Ashley

ATTORNEY

UNITED STATES PATENT OFFICE.

ED M. JENKINS, OF ITALY, TEXAS.

SANITARY MOUTHPIECE.

13,942. Specification of Reissued Letters Patent. Reissued July 6, 1915.

Original No. 1,112,291, dated September 29, 1914, Serial No. 752,693. Application for reissue filed January 14, 1915. Serial No. 2,247.

*To all whom it may concern:*

Be it known that I, ED M. JENKINS, a citizen of the United States, residing at Italy, Ellis county, and State of Texas, have invented certain new and useful Improvements in Sanitary Mouthpieces, of which the following is a specification.

This invention relates to telephone mouthpieces and has for an object to provide a mouth-piece with improved means for applying disinfectant thereto.

A further object of the invention is to provide a mouth-piece composed of a plurality of spaced shells or tubular members having means for introducing disinfectant between some of the shells and with means for disseminating the disinfecting fumes throughout the mouth-piece.

With these and other objects in view the invention comprises certain novel features, combinations, constructions and arrangement of parts as will be hereinafter more fully described and claimed.

Figure 1:
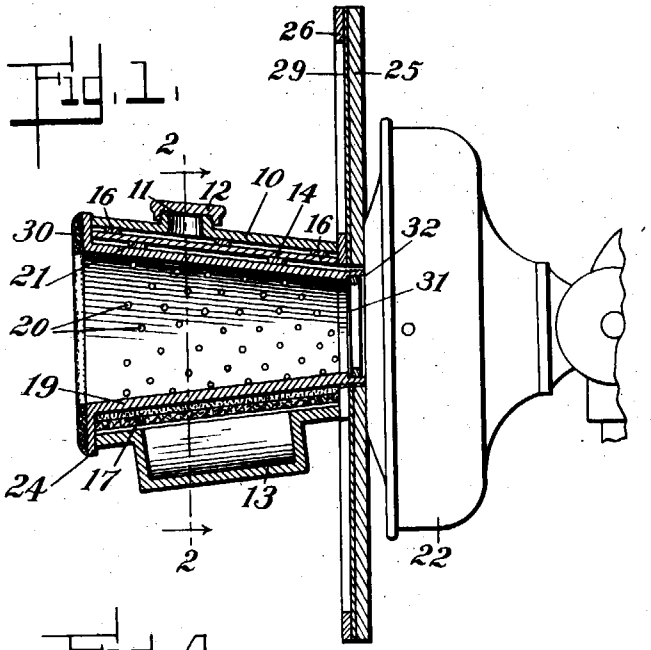
Figure 4:
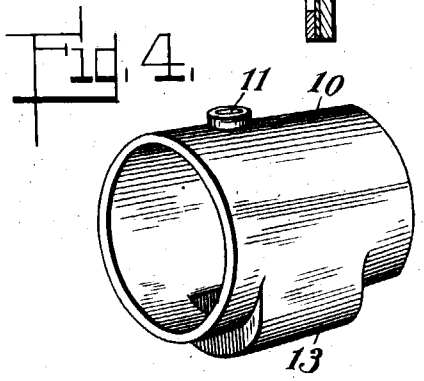
Figure 7:
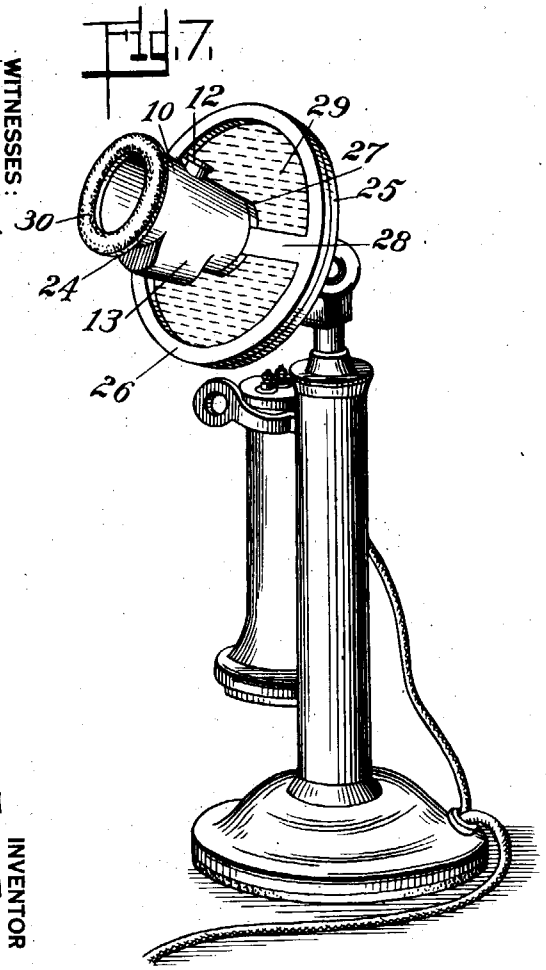
Figure 2:
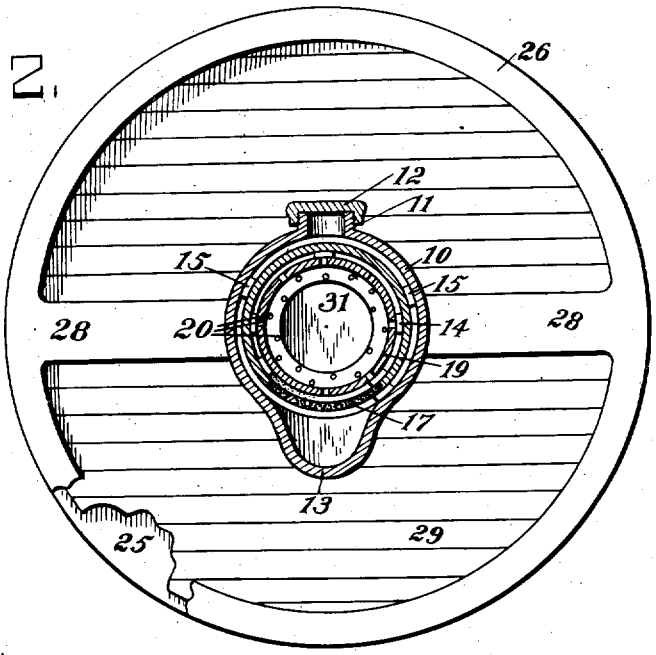
Figure 5:
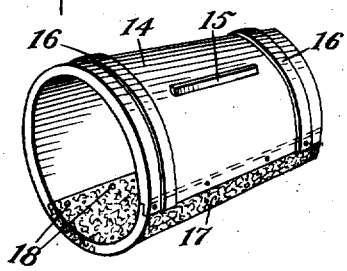
Figure 6:
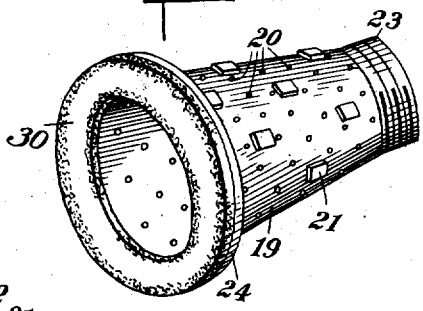
Figure 3:
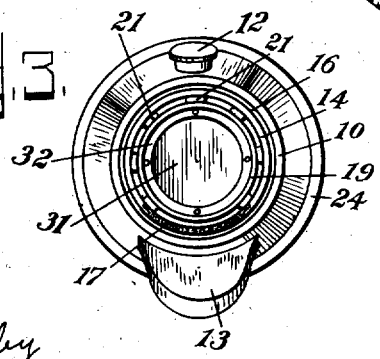

In the drawings: Figure 1 is a diametrical sectional view through the mouth-piece. Fig. 2 is a transverse sectional view taken on the line 2—2 of Fig. 1. Fig. 3 is a view of the mouth-piece in end elevation assembled seen from the end attached to the telephone transmitter. Fig. 4 is a perspective view of the outer shell. Fig. 5 is a perspective view of the intermediate shell. Fig. 6 is a perspective view of the inner shell. Fig. 7 is a perspective view of a telephone stand showing the improved mouth piece in place on the transmitter.

Like characters of reference designate corresponding parts throughout the several views.

The improved mouth-piece which forms the subject matter of this application comprises a shell or casing 10 having a nipple 11 at its upper side closed by a screw-cap or other closure 12 and with a receptacle 13 formed in its under side diametrically opposite the nipple 11. The receptacle 13 may be formed in any approved manner but is shown as stamped directly from and integrally with the shell 10.

Within the shell 10 an intermediate shell 14 is employed, such intermediate shell being spaced away from the outer shell 10 by the employment of lugs 15 and bands 16 so that an annular chamber is formed between the intermediate shell 14 and the outer shell 10. At its lower side the shell 14 is interrupted and is continued by a fabric 17 secured thereto in any approved manner as by the rivets 18. Within the shell 14 an inner shell 19 is employed, such inner shell being provided with perforations 20 preferably throughout its area and spaced away from the intermediate shell by lugs 21 so that a second annular space is formed between the intermediate shell 14 and the inner shell 19.

The inner shell 19 is provided with any approved means for engaging the telephone transmitter 22 as the screw threads 23 which attaches the inner shell to the transmitter in substantially the usual manner and also carries a flange 24 which engages the outer ends of the outer shell 10 and intermediate shell 16 to hold such shells in engagement with the transmitter or with an article interposed between the shells and the transmitter as for instance the guard shown in Figs. 1, 2 and 7.

It will be apparent that disinfecting fluid poured through the nipple 11 engages upon the intermediate shell 14 and passes around the outside of such shell into the receptacle 13 in the outer shell 10 where it is retained by such receptacle immediately beneath the fabric disseminating member 17 carried by the intermediate shell 14. The fabric member 17 prevents slopping of the disinfecting fluid while permitting the fumes therefrom to pass upwardly about the inner shell 19 to be discharged through the openings 20 into the interior of the mouth-piece.

It is obvious that the nipple 11 may be omitted and the disinfectant applied by taking the shells apart. Of course the nipple provides a more convenient way of supplying the disinfectant. It is further pointed out that the outer shell may be both the outer shell and the receptacle and that the shape of the outer shell may be changed so long as the equivalent of a receptacle is provided.

The guard above referred to comprises a heavy metal or other inflexible back disk 25 with a front annular ring 26 secured to a central eye 27 by a spider 28. Between the disk 25 and ring 26 a directory sheet 29 is interposed which is visible through the ring 26. The outer or front end of the inner shell 19 may also be provided with a padding or insulating material 30 which prevents injury to the user through contact or electrical discharge.

To prevent entry of moisture into the transmitter a metallic diaphragm 31 is inserted into the inner or smaller end of the inner shell 19 and is secured therein in any approved manner, being here shown as employing an annular ring 32 screwed into engagement with such diaphragm 31 but it is to be understood that any means of securing said diaphragm within or upon the inner end of such mouth-piece is within the scope of the present invention. This diaphragm also confines the fumes from the disinfecting material within the mouth-piece and prevents its entry into the transmitter thereby reducing the quantity of disinfecting material necessary as well as protecting the transmitter from the possible deleterious effect of such fumes.

It is to be understood that the guard, the padding 30 and the diaphragm 31 are not essential elements of this invention and may be omitted. The mouth-piece may be insulated in any suitable manner. The parts just enumerated while offering certain convenience are not essential either to the storing of the disinfectant or the dissemination of the fumes.

The invention is presented as including all such modifications and changes as properly come within the scope of the appended claims.

It is to be understood that this invention is in no way limited to the use of a liquid disinfectant as the latter may be used in other forms.

What I claim, is:

1. In a telephone transmitter mouth-piece; the combination of spaced inner, outer and intermediate shells, the inner shell having a threaded portion at its inner end providing means of connection with a telephone transmitter; and an annular flange extending laterally from the outer end of the inner shell confining and embracing the other shells; said outer shell having provision for storing a disinfectant within the same; the intermediate shell having means for admitting the disinfecting fumes from the outer shell; said inner shell being constructed to disseminate the disinfecting fumes.

2. In a telephone transmitter mouth-piece; the combination of spaced inner, outer and intermediate shells, the inner shell having a threaded portion at its inner end providing means of connection with a telephone transmitter; and an annular flange extending laterally from the outer end of the inner shell confining and embracing the other shells; said outer shell having provision for storing a disinfectant within the same; the intermediate shell having means for admitting the disinfecting fumes from the outer shell; said inner shell being constructed to disseminate the disinfecting fumes; and means for permitting the introduction of disinfectant fluid between the outer and intermediate shells.

3. In a telephone transmitter mouth-piece, spaced inner, outer and intermediate shells, means permitting the introduction of disinfectant fluid between the outer and intermediate shells, a receptacle communicating with the space between the outer and intermediate shells positioned to receive such introduced disinfectant, a disseminating member covering the receptacle, and means permitting the discharge of fumes through the inner shell.

4. In a telephone transmitter mouth-piece, an outer shell, a shell within the outer shell formed in part of foraminous material, a receptacle disposed beneath the foraminous material means facilitating the introduction of disinfectant material into the receptacle, and a perforate inner shell spaced from the intermediate shell and provided with means for securing all of said shells to a transmitter.

5. In a telephone transmitter mouth-piece, the combination with an outer shell having means for introducing a liquid disinfectant, said shell being provided with a receptacle for receiving said disinfectant, and a perforated inner shell disposed within and in spaced relation to the outer shell for guiding the disinfectant into said receptacle.

6. In a telephone transmitter mouth-piece, the combination with an outer shell having means for introducing a liquid disinfectant, said shell being provided with a receptacle for receiving said disinfectant, a perforated inner shell disposed within and in spaced relation to the outer shell for guiding the disinfectant into said receptacle, and means interposed between said inner and outer shells to disseminate the disinfecting fumes passing into the inner shell through the perforations thereof.

In testimony whereof I affix my signature in the presence of two witnesses.

ED M. JENKINS.

Witnesses:
F. B. Fuston,
E. H. Murphy.